Feb. 20, 1945. H. C. FREED 2,369,823
PLUID CONTROL COUPLING
Filed March 6, 1943
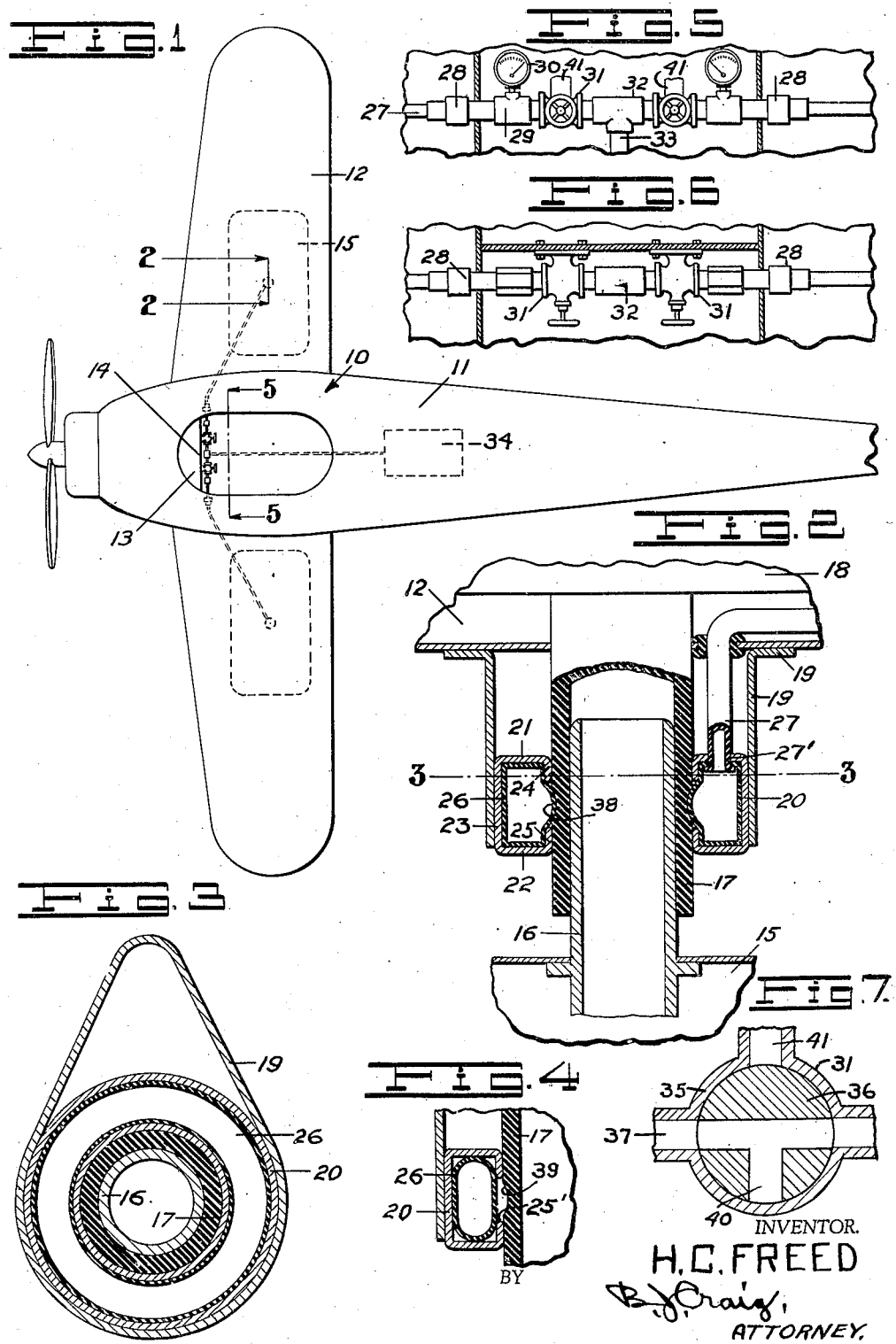
INVENTOR.
H.C. FREED
B.J.Craig,
ATTORNEY.

Patented Feb. 20, 1945

2,369,823

UNITED STATES PATENT OFFICE 2,369,823

FLUID CONTROL COUPLING

Henry C. Freed, Glendale, Calif.

Application March 6, 1943, Serial No. 478,314

2 Claims. (Cl. 285—163)

This invention relates to a fluid controlled coupling.

The general object of the invention is to provide a coupling device by means of which two conduits may be positively connected together and may be readily disconnected.

A more specific object of the invention is to provide a novel device for coupling two conduits wherein fluid under pressure serves to maintain the coupling connection which may be readily broken when the fluid pressure is released.

Another object of the invention is to provide a novel coupling device for coupling the gasoline conduit of an airplane with the discharge pipe of a gasoline drop tank.

Another specific object of the invention is to provide a novel coupling device for coupling two coaxial telescoped conduits wherein at least one of the conduits is flexible, the coupling device including fluid controlled means for maintaining pressure upon the flexible conduit thus urging it into tight engagement with the companion conduit.

Other objects and advantages of my invention will be apparent from the following description taken in connection with the accompanying drawing, wherein:

Fig. 1 is a diagrammatical top plan view showing my invention applied to an airplane;

Fig. 2 is a fragmentary, sectional, detail taken on line 2—2, Fig. 1;

Fig. 3 is a section taken on line 3—3, Fig. 2;

Fig. 4 is a fragmentary, sectional, detail showing the securing member uninflated;

Fig. 5 is a fragmentary section taken on line 5—5, Fig. 1 showing the valve control in elevation;

Fig. 6 is a fragmentary section showing the valve control in plan, and

Fig. 7 is a sectional detail showing one of the valve members.

Referring to the drawing by reference characters I have shown my invention as embodied in an airplane which is indicated generally at 10. As shown the airplane includes a fuselage 11 having wings 12 thereon. The fuselage includes a cockpit 13 having an instrument panel 14 arranged therein.

A pair of fuel drop tanks are indicated at 15. These drop tanks may be of any desired configuration and may, or may not, be of the bullet proof type and their particular construction forms no part of the present invention. Each of the drop tanks 15 is provided with an upwardly extending outlet pipe 16 which is shown as telescopically arranged in a conduit member 17. The conduit members 17 are preferably made of rubber or other flexible material and at their upper ends communicate with a fuel supply conduit 18. The fuel supply conduit 18 is suitably connected to the engine or engines (not shown) in any suitable manner and the construction is such that fuel is drawn from the tanks 15 through the outlet 16, conduit 17 and fuel supply conduit 18 whence it passes towards the engine.

Fuel drop tanks of the kind described are adapted for use with airplanes to increase the effective radius of operation. In use the plane first draws the fuel from the drop tanks and when this fuel is exhausted or when the plane is to go into battle or for other reasons it is desirable to lighten the load, the drop tanks are released and fall away from the plane.

It has been a source of inconvenience that the connection between the drop tanks and the fuel supply line will sometimes leak, causing air to be drawn into the fuel line, thus causing the motor to operate inefficiently or to cease operating entirely and one of the objects of my invention is to overcome this difficulty.

According to the disclosure I arrange a bracket 19 about each pipe 17. This bracket is shown as of streamline form (Fig. 3) and at its upper end is provided with a flange 19' which is secured to the lower portion of the airplane wing. The bracket supports a coupling member indicated generally at 20. This coupling member is in the general shape of a torus including a top wall 21, a bottom wall 22, an outer periphery 23, an upper inner flange 24 and a lower inner flange 25. The flanges 24 and 25 form a restricted opening 25'.

The member 20 preferably has an internal diameter which approximates the external diameter of the pipe 17 so that it may be slid along this pipe in assembling and will function properly in use.

Within the member 20 I arrange a flexible fluid supply tube 26 which is shown as provided with an operating fluid supply conduit 27 which passes through a hole 27' in the top 21 of the member 20.

The conduit 27 is connected by a fitting 28 to a coupling 29 which includes and communicates with a pressure indicator 30. The coupling 29 also communicates with a valve 31 which latter is shown as communicating with a T 32 from which a header 33 extends to a source of fluid under pressure indicated at 34. In the usual practice airplanes are provided with reservoirs for air under pressure and for liquid under pressure and my device is adapted for use with either of these fluid pressure sources.

The valve 31 as shown in Fig. 5 includes a body 35 having a rotatable member 36 therein. The member 36 has a passageway 37 therethrough. When the valve member 36 is in the position shown in Fig. 7 the tank 34 communicates with the conduit and fluid under pressure passes through the conduit 27 thus creating fluid pressure in the tube 26. This action causes the tube to expand through the slot 25' with the expanding portion 38 engaging the tube 17 and clamping this tube tightly against the outlet of nipple 16. The tube 17 is shown as provided with a peripheral recess 39 in which the part 38 engages. A somewhat tighter joint is provided when this recess is employed.

The valve member 36 also includes a lateral outlet 40 and when the valve stem is turned through 90° the part 40 will communicate with the conduit 37 while the conduit 37 will communicate with an outlet 41 in the valve body 35. This outlet 41 is preferably connected to a suitable reservoir (not shown) into which the fluid is bled from the conduit 27 thus relieving pressure in the tube 26.

In operation the drop tanks are arranged in place, the nipple 16 and pipe 17 being telescoped. This is done while the valve is turned to bleed the tube 26. When the parts are assembled the valves 31 are operated to place the tubes 26 in connection with the tank 34, thus creating fluid pressure in the tubes and providing a tight seal between the pipe 17 and nipple 16. When the drop tanks are to be released the operator rotates the valve 36 thus placing the tubes 26 in communication with the exhaust pipe 41 so that the tubes are bled and their pressure reduced. After this is done the drop tanks are released (by means not shown).

The details of valve construction shown afford no part of my invention and other types of valves may be employed.

I preferably make the member 20 of metal, plastic or other suitable material, while the tube 26 and pipe 17 may be made of rubber, synthetic rubber or other flexible material suitable for the purpose. I show two drop tanks but it will be understood that the number may be varied as required.

From the foregoing description it will be apparent that I have invented a novel fluid control coupling which can be economically manufactured, easily actuated and which is positive in its operation.

Having thus described my invention, I claim:

1. A coupling device adapted to connected a flexible hose with the outlet pipe of an airplane drop tank, said device comprising a substantially torus shaped body and having a closed outer periphery, a closed top wall and a closed bottom wall, said body having an upper flange and a lower flange extending from the top wall and bottom wall respectively, said flanges being opposed to each other and forming a restricted opening which is of less width than the axial length of the torus, said body being adapted to be arranged on a flexible hose, an expansible tube in said torus, said tube having a filling conduit, and means to support the torus.

2. A coupling device adapted to connect a flexible hose with the outlet pipe of an airplane drop tank, said device comprising a substantially torus shaped body of uniform wall thickness and having a closed outer periphery, a closed top wall and a closed bottom wall, said body having an upper flange and a lower flange extending from the top wall and bottom wall respectively, said flanges being opposed to each other and forming a restricted opening which is of less width than the internal length of the torus, said body being adapted to be arranged on a flexible hose, an expansible tube in said torus, said tube having a filling conduit, said top wall having an aperture, said filling tube extending through said aperture, and means to support the torus.

HENRY C. FREED.